United States Patent
Prot

(10) Patent No.: US 9,246,881 B2
(45) Date of Patent: Jan. 26, 2016

(54) METHOD AND SYSTEM FOR SECURING THE EXCHANGE OF DATA BETWEEN A CLIENT MODULE AND A SERVER MODULE

(75) Inventor: Herve Prot, Clermont-Ferrand (FR)

(73) Assignee: SYMEOS, Clermont-Ferrand (FR)

( * ) Notice: Subject to any disclaimer, the term of this patent is extended or adjusted under 35 U.S.C. 154(b) by 40 days.

(21) Appl. No.: 14/119,077

(22) PCT Filed: May 24, 2012

(86) PCT No.: PCT/IB2012/001028
§ 371 (c)(1),
(2), (4) Date: Jan. 6, 2014

(87) PCT Pub. No.: WO2012/164368
PCT Pub. Date: Dec. 6, 2012

(65) Prior Publication Data
US 2014/0122890 A1 May 1, 2014

(30) Foreign Application Priority Data

May 27, 2011 (FR) .................................... 11 01652

(51) Int. Cl.
*H04L 9/32* (2006.01)
*H04L 29/06* (2006.01)
*G06F 21/60* (2013.01)

(52) U.S. Cl.
CPC .............. *H04L 63/04* (2013.01); *G06F 21/606* (2013.01); *H04L 9/3247* (2013.01); *H04L 63/08* (2013.01); *H04L 63/0807* (2013.01); *H04L 63/0853* (2013.01)

(58) Field of Classification Search
None
See application file for complete search history.

(56) References Cited

U.S. PATENT DOCUMENTS 6,938,017 B2 * 8/2005 Yen et al. ..................... 705/62
7,725,723 B2 * 5/2010 Landrock et al. ............ 713/176

FOREIGN PATENT DOCUMENTS

| FR | 2806229 A1 | 9/2001 |
| FR | 2828309 A1 | 2/2003 |
| WO | WO 0123980 A1 | 4/2001 |
| WO | WO 03015370 A2 | 2/2003 |
| WO | WO 2008060725 A2 | 5/2008 |

OTHER PUBLICATIONS

International Search Report mailed Sep. 25, 2012 in International Patent Application No. PCT/IB2012/001028.

* cited by examiner

*Primary Examiner* — Brandon Hoffman
(74) *Attorney, Agent, or Firm* — Thomas, Karceski & Karmilovich, PC

(57) ABSTRACT

A method for securing the exchange of data between a client module and a server module includes steps where: the token module initializes a token and the client module sends the data, which includes a unique identifier and the initialized token to a first security module of the server module; the first security module and the second security module exchange security data bilaterally with one another; the server module transforms the received token; the client module receives the server data, verifies the token and transforms the latter; the client module sends the data, which includes the transformed token to the second security module of the server module, which receives the data, and verifies the identifier and the transformed token; and the second security module communicates with the destination module.

15 Claims, 10 Drawing Sheets

(state of the art)

METHOD AND SYSTEM FOR SECURING THE EXCHANGE OF DATA BETWEEN A CLIENT MODULE AND A SERVER MODULE

CROSS-REFERENCE TO RELATED APPLICATION(S)

This is a National Stage Entry into the U.S. Patent and Trademark Office from International PCT Patent Application No. PCT/IB2012/001028, having an international filing date of May 24, 2012, and which claims priority to French Patent Application No. 11/01652, filed on May 27, 2011, the entire contents of both of which are incorporated herein by reference.

TECHNICAL FIELD OF THE INVENTION

The present invention relates to a method for securing the exchange of data between a client module and a server module. It also relates to a corresponding system for exchanging data between a client module and a server module.

DESCRIPTION OF THE RELATED ART

Multiple embodiments of systems and methods for ensuring a level of security are known, to prevent unauthorized persons from accessing data or applications they were not intended to receive. For example, FIG. 1 illustrates an exemplary data securing method of a known type. An issuer or client issues an authentication request to a receiver. The receiver verifies the identifier and a code, such as a PIN code (Personal Identification Number), if any. If an identity is recognized, the receiver sends relevant data to the issuer, such as, for example, data corresponding to a bank account, or any other type of user account. As long as the connection is not interrupted, the issuer can query the receiver, which then sends the requested data. It has been found that this type of method is particularly vulnerable to attacks of the MITM (Man In The Middle) type and/or of the "phishing" type. In the first case, a third party may intercept data transfers between the two entities, and thus obtain a series of data without the knowledge of these entities. It may even issue a query by substituting itself for the issuer. In the second case, an intruder impersonates a trusted receiver, often a service center known to the issuer. The intruder requests confidential data. The issuer, believing it is communicating with a trusted receiver, transmits the data, often without even immediately detecting the fraudulent act. Due to the recent very strong growth of data exchange between users and servers of all kinds, often involving the exchange of confidential or sensitive data, and due to the increasing number of malicious persons, or even persons voluntarily seeking to access third party data, numerous security technologies have recently been developed.

Document FR 2 806 229A1 discloses a method for carrying out an interaction or a transaction between a user and a product or service provider, through a data transmission network, which is accessible to third parties. This method is of the type which requires prior authorization, subject to the submission by the user of evidence proving his entitlement, comprising entitlement information, and requires verification of this information. According to this method, only a portion of said information is transferred over the network, which alone is insufficient for authorizing the provision of the products or services, after the other portion has been previously stored in an intermediate security organization, and the two information portions have been merged for said verification. Such a method is cumbersome because it involves the introduction of a trusted third party, which involves hardware, operating costs, and the risk of failure and unreliability, etc.

Document FR 2 828 309A1 discloses a method for carrying out a transaction using a client terminal, a provider terminal, a central server and a management center, which are connected by means of the telephone network. The transaction is secured by the fact that the client communicates his telephone number to the service provider, which communicates this telephone number and data of the intended transaction to the central server, with the central server managing the subsequent exchanges of information by requesting confirmation from the client, and then contacting the managing center to obtain a mini-validation message, which is then transmitted to the provider terminal. This guarantees the security of clients who do not transmit their credit card number, of service providers, for whom a valid transaction is guaranteed, and of managing centers such as banks which are assured of having received the client's agreement. This method involves a manager module, with the corresponding hardware and steps dedicated to communication with this third party.

Other methods involve the use of specific technical means. For example, according to document WO 2008/060725 a biometric reader is used, which is provided for identifying a user. This type of system is impractical because it requires appropriate hardware. Existing sites must therefore be equipped before they can be considered for use in the implementation of the method.

Document WO 03/015370 discloses a method and a device for digitally signing data. The device provides a server which centralizes the private keys of a plurality of users. Users use a workstation for contacting the signature server. According to the disclosed method, the workstation contacts the signature server, which in turn contacts an authentication server. The latter transmits a password or a token, on the one hand, to the user via a communication link which is separate from the workstation, and on the other hand, to the signature server. In the latter case, the transmitted password or token is a variant of the one sent to the user. The user transmits the received password or token to the signature server. The latter performs a comparison of the passwords or tokens received by the authentication server and by the user. If the data match, the signature server digitally signs the data provided by the user. According to this method, the authentication server contacts the user by means of an element or module which is separate from the workstation, such as, for example, by using a SMS sent to a mobile phone. In fact, this server would not be able to start communicating with the workstation by itself. This method is not in itself a data transmission method, but only a data signature method. Signing is done on the central server so that the user does not have to store his private signature key in a secure manner. Furthermore, neither the user nor the workstation will generate a token. If a token is generated, it originates from the authentication station, which transmits it to the user. This method has the drawback of being sensitive to possible attacks by a Man in the Middle.

Document WO 01/23980 discloses a method and a device wherein a client platform is adapted to ensure secure use of data received from a server, and the server is adapted to check that the client platform provided for receiving data is indeed configured according to the secure mode intended before the transmission of data via a secure link.

Additionally, the known systems and methods are ineffective against most phishing attacks and intrusions, and most importantly, no current system or method allows a truly effective protection to be generated against attacks or intrusions of the "MITM" type.

The present invention provides various technical means to overcome these various drawbacks.

SUMMARY OF THE INVENTION

Firstly, a first object of the present invention is to provide a method and a system for securing the exchange of data between a user or client module and a server module allowing various types of intrusion, hacking or attack from known or unknown sources to be effectively combated.

Another object of the present invention is to provide a system and a method for securing the exchange of data between a user or client module and a server module allowing both attacks of the "MITM" and phishing type to be effectively combated.

Yet another object of the present invention is to provide a system and a method for securing the exchange of data between a user or client module and a server module allowing a very high level of security to be achieved, but without requiring infrastructures which are cumbersome and expensive to implement, or having to use specific hardware.

Yet another object of the present invention is to provide a system and a method for securing the exchange of data between a user or client module and a server module allowing a very high level of security to be achieved, without significantly slowing down data transfer rates.

Yet another object of the present invention is to provide a system and a method for securing the exchange of data between a user module and a server module allowing a very high level of security to be achieved, without requiring complex manipulations or operations for the users.

To this end, the present invention provides a method for securing the exchange of data between a client module and a server module, wherein the server module includes a set of security modules, with the method including the following steps, in which:

- the token module of the client module initializes a token and the client module sends data comprising a unique identifier and the initialized token to a first security module of the server module;
- the first security module of the server module receives the data and verifies the unique identifier and the received token;
- the first security module and the second security module exchange security data bilaterally with one another;
- the server module transforms the received token;
- the first security module of the server module sends data containing the transformed token to the client module;
- the client module receives the server data containing the transformed token, verifies the token and, if accepted, transforms it again;
- the client module sends data including the unique identifier and the transformed token to the second security module of the server module;
- the second security module of the server module receives the data, verifies the identifier and the transformed token;
- the second security module communicates with the destination module;
- the destination module responds.

With such a method, the present invention provides a truly triangular approach, with on the one hand a client module to carry out all of the exchanges with the server, and on the other hand, a token generated by the client module before the data exchange transmissions are started. Furthermore according to this method, the token is transformed each time the data transits from one module to the next. Finally, the fact that exchanges are carried out from the user towards the server, and then in the opposite direction, and again from the user towards the other module of the server, allows a verification of the token to be performed both by the first module of the server and by the client module, and finally by the second module of the server. Thus, if an attack of the "MITM" type occurs, it is detected by one or the other of the modules when the token is verified. The method ensures that the tokens are issued by authorized sources. Splitting the exchanges between a plurality of security modules allows a security level to be achieved which is consistent with the risks inherent to attacks of the MITM and/or "phishing" type.

The response(s) of the destination module can be transmitted in various ways, depending on the case. In a first embodiment, the destination module responds to the second security module, which transmits the relevant data to the client module. In another embodiment, the destination module directly responds to the client module.

Advantageously, the server token is initialized or transformed by the second data security module and transmitted to the first data security module.

Also advantageously, after a module has received a token, the latter is transformed or reset. In an alternative embodiment, the token is transformed by embedding or using a user code in the token as a transformation parameter.

In an alternative embodiment, the data exchanged between the client module and the server module includes a digital signature, allowing the level of security to be raised.

In another alternative embodiment, after the destination data has been sent to the client module, said client module performs at least one further transfer of data to the second data security module of the server module.

Advantageously, during an iteration between the client module and the second data security module, the last data sent by the destination includes a token which is distinct from the previous token.

According to an advantageous alternative embodiment, the client module and the second data security module of the server module exchange data in turn, with, in each exchange loop, an intermediate exchange being performed between the second data security module and the destination module.

According to another alternative embodiment, the client module and the destination module exchange data in turn.

According to yet another embodiment, before the token-containing message is allowed to be sent by the client module, the client module receives a user code (PIN). A verification is then performed by the verification module.

The present invention also provides a system for securing the exchange of data between a client module and a server module for implementing the aforementioned method, wherein:

- the client module comprises a microprocessor, a memory and a communication module;
- the server module comprises a microprocessor, a memory and a set of security modules including at least two modules, each provided with:
  - a communication module, to perform data exchanges between the client module and the server module;
  - a verification module, to verify data provided by another module;

a security exchange module, allowing security data to be exchanged between the security modules of the server module;

and wherein:

the server module and the client module each include at least one token module to generate the tokens;

the set of security modules comprises a first security module, for carrying out the first exchanges with the client module in a data exchange loop between the client module and the server module, and a second security module, for carrying out subsequent exchanges with the client module;

the client module and the at least two security modules of the server module are arranged in a triangular architecture.

Thanks to such a triangular architecture, intrusions of the "MITM" and "phishing" type can be reliably blocked. The separation of the server module into at least two security modules allows exchanges to be shared and the client and server identities to be checked on a reciprocal basis, for maximum security. Thus, the separation of exchanges between a plurality of security modules allows a level of security to be achieved, which is consistent with the risks inherent to attacks of the MITM and/or "phishing" type. The triangular arrangement is particularly effective against attacks of the "MITM" type.

According to an advantageous embodiment, the token modules allow a first token to be initialized and a previously received token to be transformed.

According to an alternative embodiment, the token module of the server module is associated with the second security module.

Also advantageously, the token modules are adapted to generate random numbers. An authentication or security token issuer module can thus check the authenticity of a message on its return, by checking the authentication token.

Also advantageously, the client module also comprises a cryptographic module to encrypt or decrypt data and/or digitally sign data and/or check digital signatures.

DESCRIPTION OF FIGURES

All implementation details are given in the following description, with reference to FIGS. 1 to 11, presented solely for the purpose of non-limiting examples and in which:

FIG. 2 is a schematic view of a first embodiment of a system for securing data exchanges according to the present invention;

FIG. 3 is a schematic view of a second embodiment of a system for securing data exchanges according to the present invention, which is capable of operating automatically;

FIG. 4 is a schematic view of an alternative embodiment of a system for securing data exchanges according to FIG. 2;

FIG. 5 is a schematic view of an alternative embodiment of a system for securing data exchanges according to FIG. 3;

DETAILED DESCRIPTION OF THE INVENTION

Figure 2:
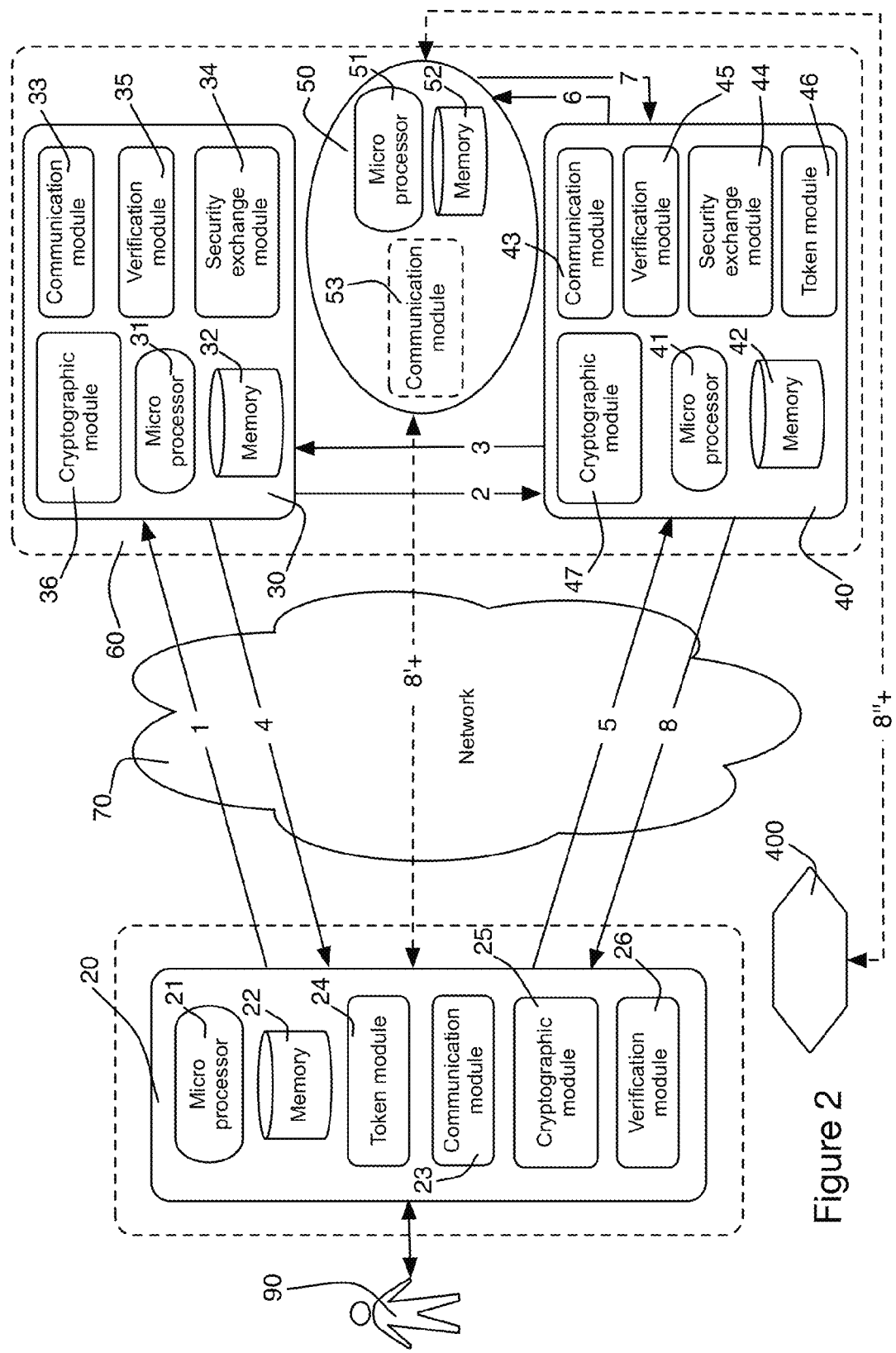
FIGS. 2 to 5 schematically show various exemplary embodiments of systems for securing data exchanges according to the present invention, with the different steps involving data exchanges performed between the various modules being denoted by arrows numbered according to the normal order of operations of the method; thus.

FIG. 2 illustrates an example system for the securing of data between a client module and a server module according to the present invention. A client module 20, allows a user to communicate with a server module 60, in order to perform data exchanges.

The client module 20 includes a computing unit such as a microprocessor 21 and a working memory 22, a communication module 23 and a token module 24. According to various alternative embodiments, the computing unit 21, as well as the working memory 22 can be centralized for the entire client module 20, or may be arranged externally, with connections to various modules, or distributed within each of the communication module 23 and token module 24. A verification module 26 allows the identifier to be checked, such as, for example, an identifier inserted into the message from the client module, and a signature, when appropriate, of the message data.

Communication module 23 is intended for carrying out data transfers between the client module 20 and one or more servers 60 located remotely, and connected by a wired, radio network 70, or the like. The token module 24 is intended for generating and/or transforming and/or resetting the tokens. According to the embodiment provided, the tokens can have various forms and/or formats. In an preferred embodiment, the tokens are random numbers.

In this example, server 60 includes two security modules: an initialization module 30 and an interface module 40. The initialization module 30 includes a computing unit such as a microprocessor 31 and a working memory 32, a communication module 33, a verification module 35, and a security exchange module 34. According to various alternative embodiments, the computing unit 31, as well as the working memory 32 can be centralized for the entire security module 30, or may be arranged externally, with connections to various modules, or distributed within each of the communication 33, verification 35 and security exchange 34 modules. Verification module 35 allows the identifier to be checked, such as, for example, an identifier inserted into the message from the client module, and a signature, when appropriate, of the message data. Module 34 allows specific data to be exchanged with interface module 40.

Interface module 40 includes a computing unit such as a microprocessor 41 and a working memory 42, a communication module 43, a verification module 45, and a security exchange module 44. According to various alternative embodiments, the computing unit 41, as well as the working memory 42 can be centralized for the entire interface module 40, or may be arranged externally, with connections to various modules, or distributed within each of the communication 43, verification 45 and security exchange 44 modules. Verification module 45 allows the identifier and, when appropriate, a signature of the message data, to be checked. The module 44 allows specific data to be exchanged with the initialization module 30.

Server module 60 includes or is connected to a destination module 50, also provided with of a computing unit such as a microprocessor 51 and a working memory 52, which are independent, or shared with other modules. This module is generally the final destination with which the client module 20 establishes communications, either to enable the launch of an application, or to carry out a data exchange. A user 90 having access to the client module 20, for example by means of a user interface, can carry out the operations provided for launching the method.

Preferably, each module includes a cryptographic module 25, 36, 47, in order to increase the security level of the system, by encrypting and/or digitally signing the message data.

The implementation of the various aforementioned modules (for example modules 20, 30, 40) is advantageously carried out by means of implementation instructions, allowing the modules to perform the operation(s) specifically provided for the relevant module. The instructions can be in the form of one or more pieces of software or software modules implemented by one or more microprocessors. The module(s) and/or pieces of software is/are advantageously carried out in a computer program product comprising a recording carrier or recording medium usable by a computer and comprising a computer-readable program code embodied in said carrier or medium, allowing application software to be executed on a computer or other device comprising a microprocessor such as a telephone of the "smartphone" type, or the like.

Figure 3:
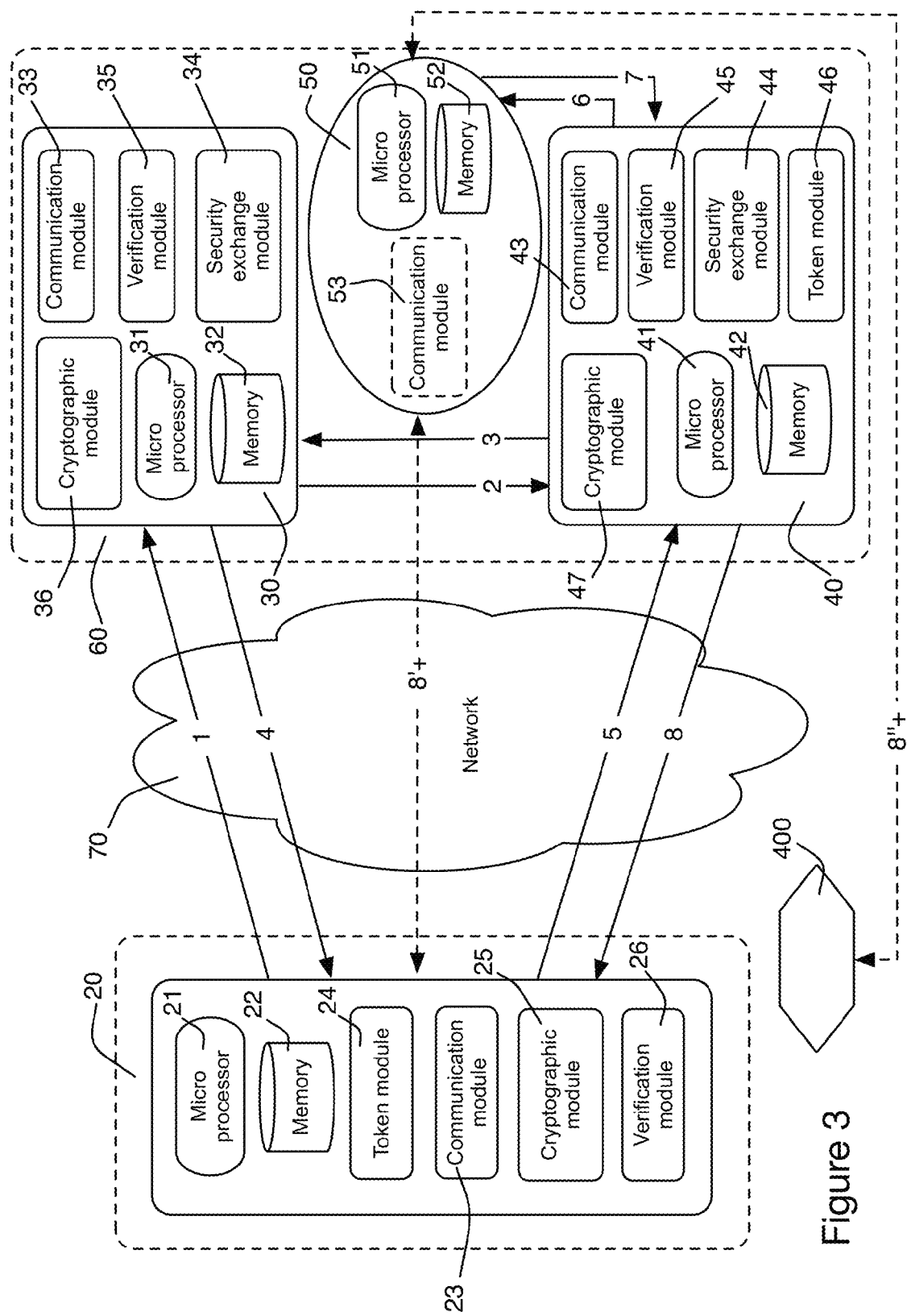

FIG. 3 shows an alternative embodiment wherein the human user 90 of FIG. 2 is not required. Client module 20 thus allows for automated operation, requiring no intervention of an external or human user, for example concerning the decision to launch the method. In the example of FIG. 3, an automated module or method, which is managed by the client module, automatically manages operations, so that exchanges between client module 20 and server module 60 are performed automatically, at the appropriate time. Module 20 can be autonomous, or can be integrated into a more complex entity, such as a computer, a machine, a system, etc. It may also be incorporated into a simple physical entity such as a smart card, a USB stick, a keychain, a car-key fob, etc.

Figure 4:
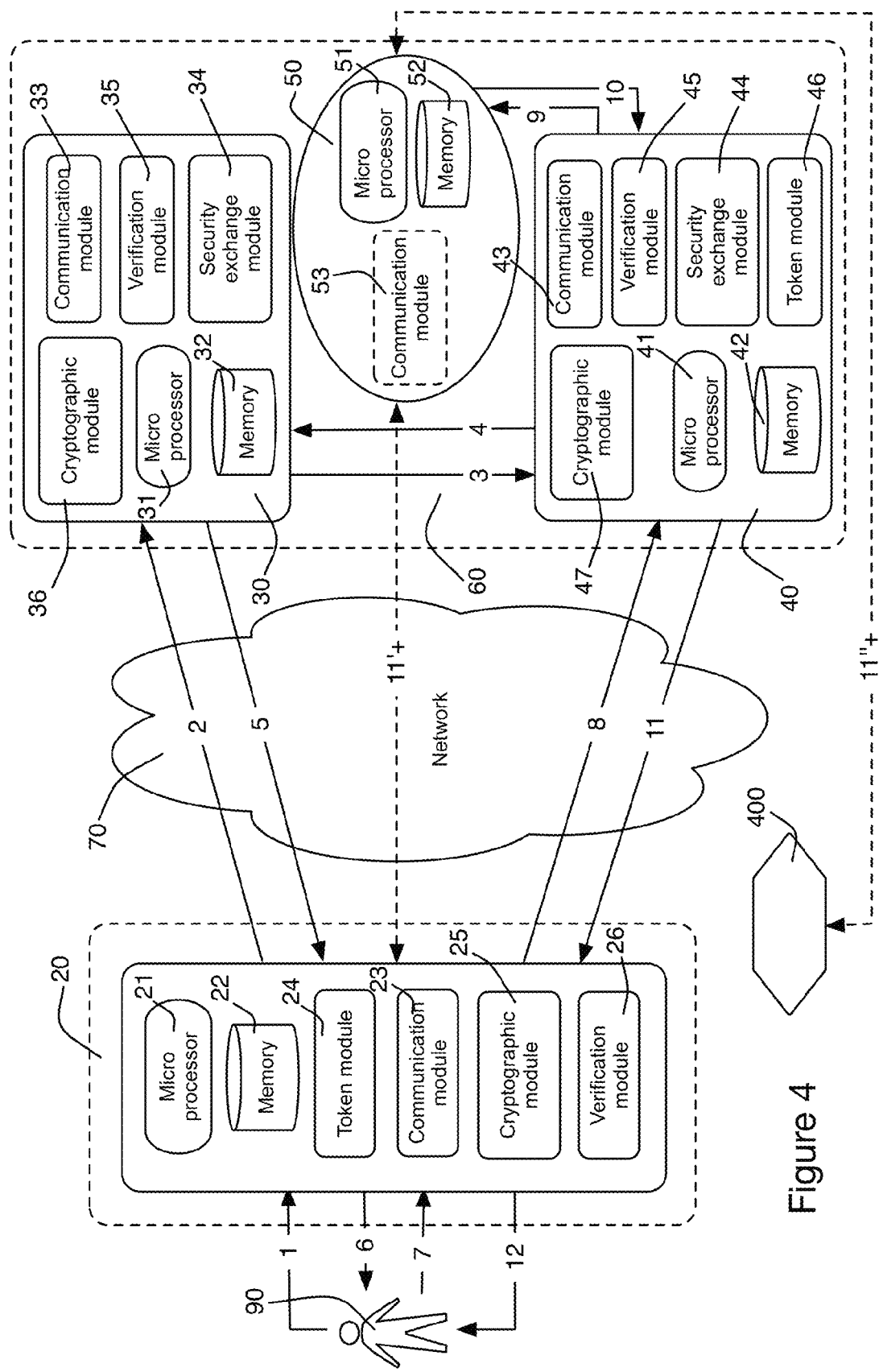
Figure 5:
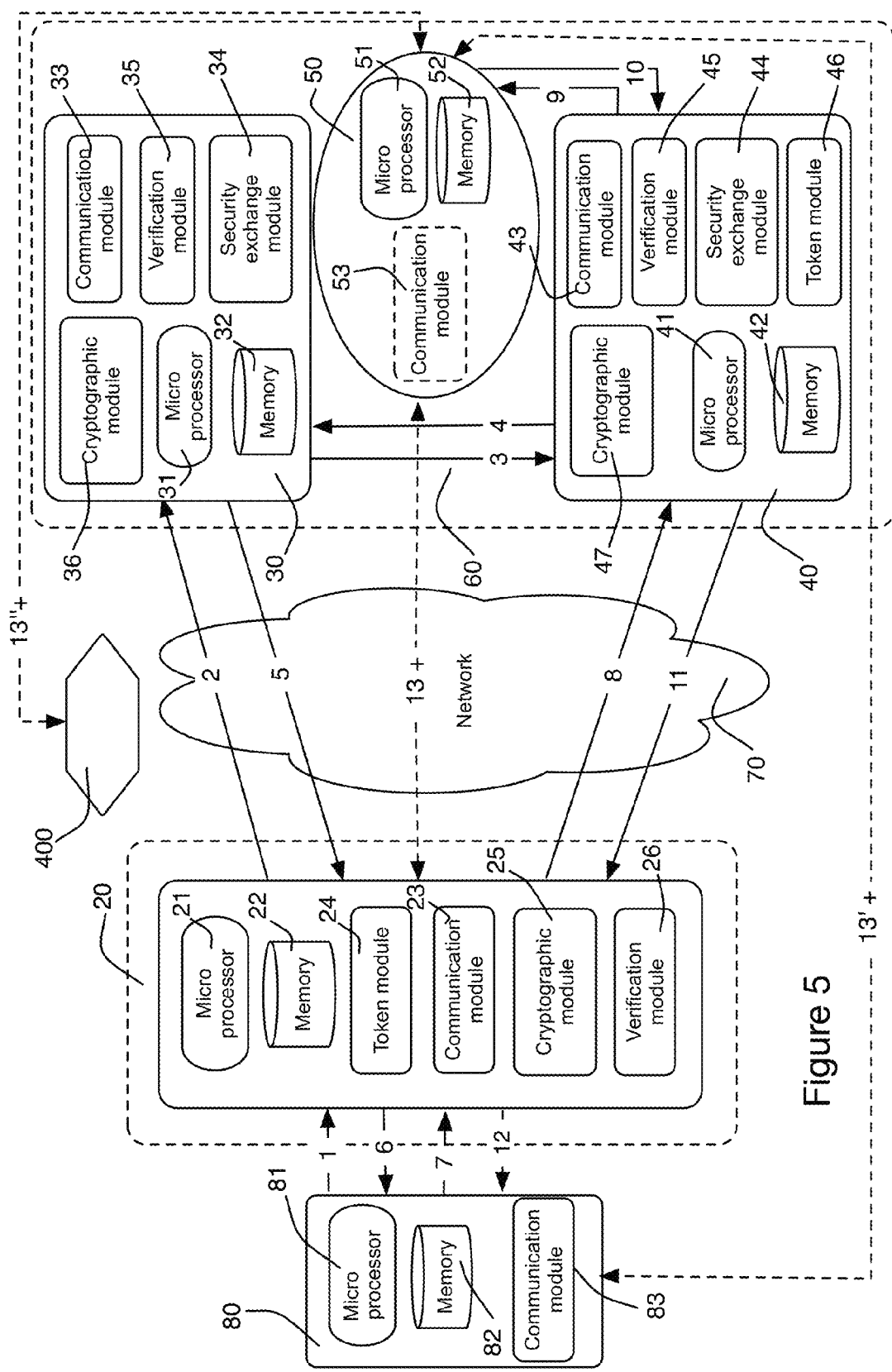

FIGS. 4 and 5 show alternative embodiments of FIGS. 2 and 3, with the detailed steps of the method according to the present invention being represented by means of arrows numbered from 1 to 13. These figures are shown in more detail hereafter, in connection with FIG. 6. Additionally, in these alternative embodiments, the cryptographic modules 25, 36 and 47 of the various modules make it possible to encrypt and/or digitally sign the contents of the exchanged messages.

Figure 1:
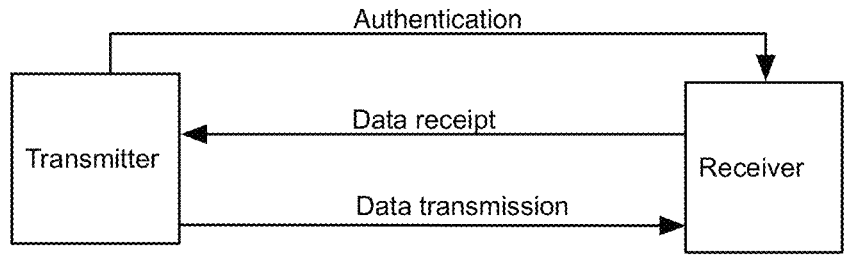
FIG. 1 is a schematic view of a data exchange system of a known type.
Figure 6:
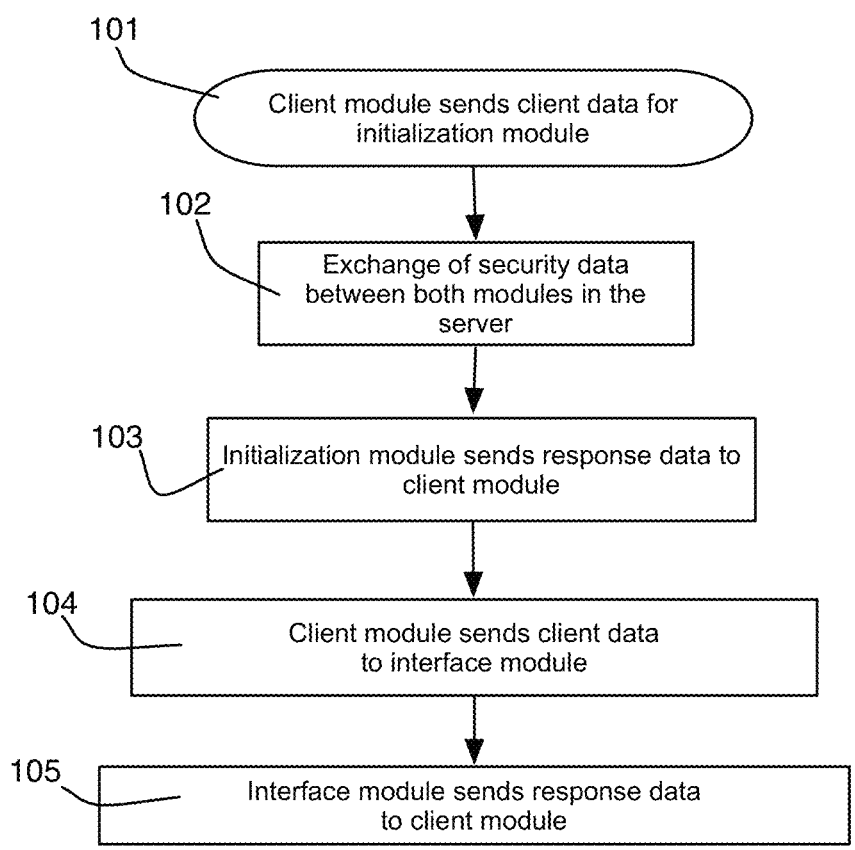
FIG. 6 shows a block diagram of the main steps of the method for securing data exchanges according to the present invention.

FIG. 6 shows the basic principle of the method for securing the exchange of data according to the present invention. In step 101, client module 20 sends client data to the initialization module 30 of server module 60, as shown by arrow 1 in FIG. 2 or FIG. 3. The client data includes at least one unique identifier allowing the issuer of the message or the user to be identified. In an advantageous alternative embodiment, the data additionally contains a token, generated by the token module 24. Before it is sent, the token is known only to the client module. Communication modules 23 and 33 allow the communication links to be established between client module 20 and initialization module 30.

After the client data have been received by initialization module 30 and the user's identifier has been verified, initialization module 30 and interface module 40, in step 102, exchange security data with one another. This step is illustrated by arrows 2 and 3 in FIGS. 2 and 3. Initialization module 30 sends at least the identifier data to interface module 40. The reception of this data by interface module 40 indicates that client data have been received by initialization module 30 from the user corresponding to the unique identifier received. In response to the sending of data, interface module 40 sends at least one token generated by a token module 46 (arrow 3 in FIG. 2 or in FIG. 3).

In step 103, initialization module 30 sends response data to client module 20, as shown by arrow 4 in FIG. 2 or FIG. 3. This data contains at least one token generated (or transformed or reset) by token module 46.

After it has received this data, client module 20 sends client data to interface module 40, in step 104, as illustrated by arrow 5 in FIG. 2 or FIG. 3. This data contains at least one token. Finally, in step 105, interface module 40 sends response data to client module 20. According to the embodiments of the present invention, the kind and/or contents of this data can vary depending on the needs. For example, for a configuration in which the method aims to secure a single data exchange, response data from the interface module 40 may contain the requested data. For a configuration in which the method aims to launch a given application in a secure manner, the response may consist in launching said application. Arrow 8 of FIGS. 2 and 3 illustrates this step.

Figure 7:
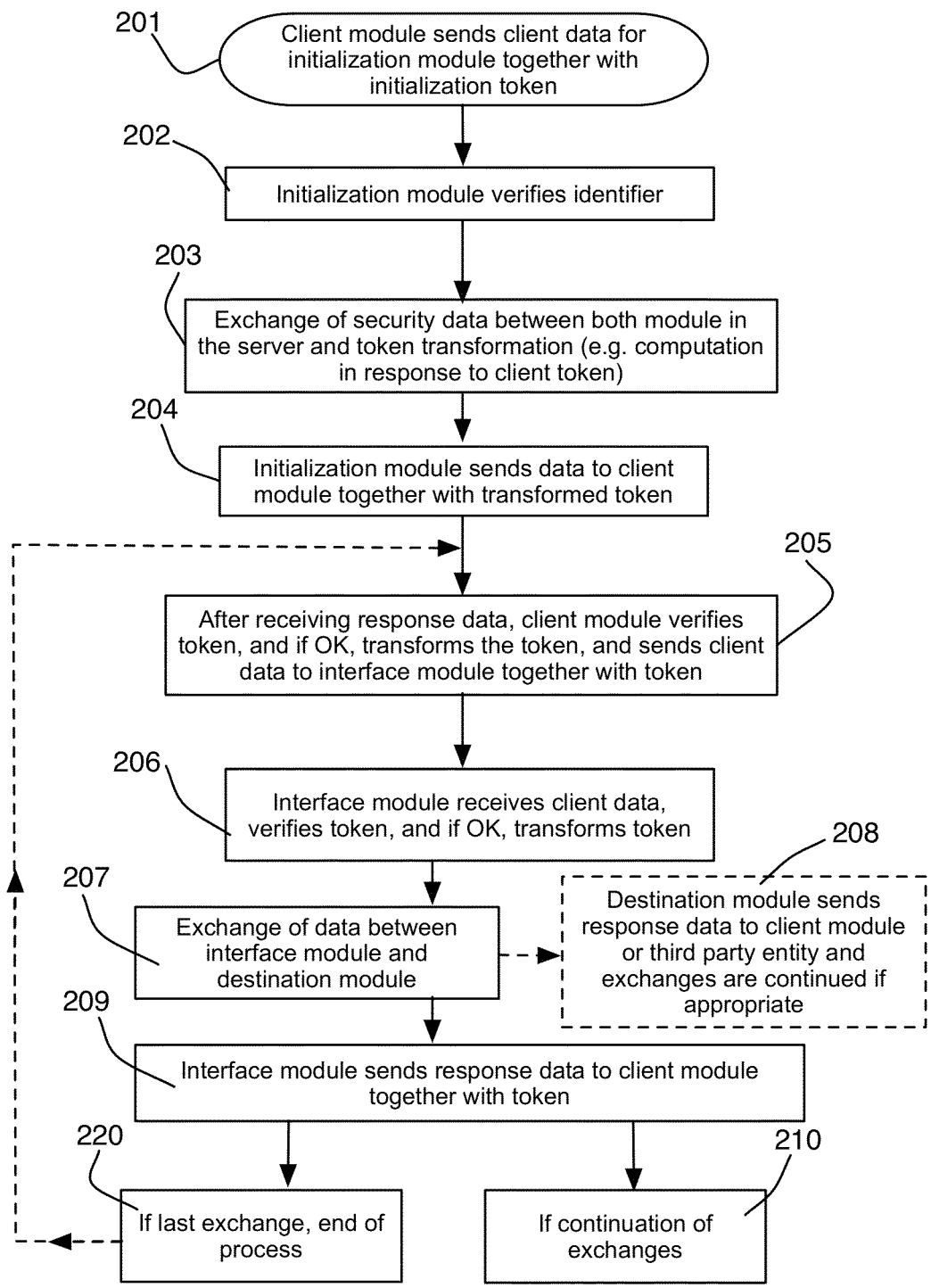
FIG. 7 shows a block diagram of an alternative embodiment of the method for securing data exchanges according to the present invention.

FIG. 7 schematically illustrates the steps for implementing an advantageous alternative embodiment of the method shown in FIG. 6. In step 201, client module 20 sends client data to the initialization module 30 of server module 60, as shown by arrow 1 in FIGS. 2 and 3. The client data includes at least one unique identifier allowing the issuer of the message or the user to be identified. In an advantageous alternative embodiment, it additionally contains a token, generated by the token module 24. Before it is sent, the token is known only to the client module 20. Communication modules 23 and 33 allow the communication links to be established between client module 20 and initialization module 30.

After the client data have been received by initialization module 30, in step 202, the user's identifier is verified. If this identifier is recognized and authorized, the method continues to step 203, where initialization module 30 and interface module 40 exchange security data with one another. This step is illustrated by arrows 2 and 3 in FIGS. 2 and 3. Initialization module 30 sends at least the identifier data to interface module 40 and/or an initialization token, if any, from the client module. The reception of this data by interface module 40 indicates that client data have been received by initialization module 30 from the user corresponding to the identifier received. In response to the sending of data, interface module 40 sends at least one token generated or modified or reset by the server's token module 46 (arrow 3 in FIGS. 2 and 3).

In step 204, initialization module 30 sends the server data in response to client module 20, as shown by arrow 4 in FIGS. 2 and 3. This data contains at least the token generated by the server's token module 46.

After it has received this data from the server, client module 20 sends client data to interface module 40, in step 205, as illustrated by arrow 5 in FIGS. 2 and 3. This data contains at least the previously received token, preferably transformed or reset.

In step 206, interface module 40 receives client data and verifies the token, for example by performing a compatibility comparison between the received token and the token generated in step 203. If the token is acceptable, it is preferably transformed or reset.

In step 207, interface module 40 and destination module 50 exchange data with one another (arrows 6 and 7 in FIGS. 2 and 3). According to the embodiments of the present invention, the kind and/or contents of these exchanges can vary depending on the needs. For example, for a configuration in which the method aims to secure a single data exchange, interface module 40 queries destination module 50 with a specific request, and the destination module responds by sending the relevant data. Depending on the case, the response of the client module may comprise response data to a request, or, for a configuration in which the method aims to launch a given application in a secure manner, the response may consist in launching said application.

The following steps can vary, depending on the destination of the response data from the client module, and depending on whether or not exchanges are continued for one or more additional loops.

Step 208 relates to the case where the response data from the destination module 50 is transmitted directly to the client module 20, as shown by arrow 8'+ in FIGS. 2 and 3, with exchanges being continued, or not, depending on the case. In an alternative embodiment, the data is transmitted to a third party entity 400, with exchanges being continued, or not, as shown in the Figure in connection with arrow 8"+ and the third party entity 400. In another alternative embodiment, data exchanges with a third party entity 400 transiting via the interface module 40.

Step 209 relates to the case where the response data from the destination module 50 is transmitted to interface module 40 before being retransmitted to client module 20, as shown by arrows 7 and 8 in FIGS. 2 and 3, with exchanges being continued, or not, depending on the case. Step 210 in FIG. 7 illustrates an example in which the exchanges are not continued. Step 220 of FIG. 7 illustrates an example in which exchanges are continued. The method then continues by returning again to step 205 of FIG. 7, as shown in the diagram.

Figure 8:
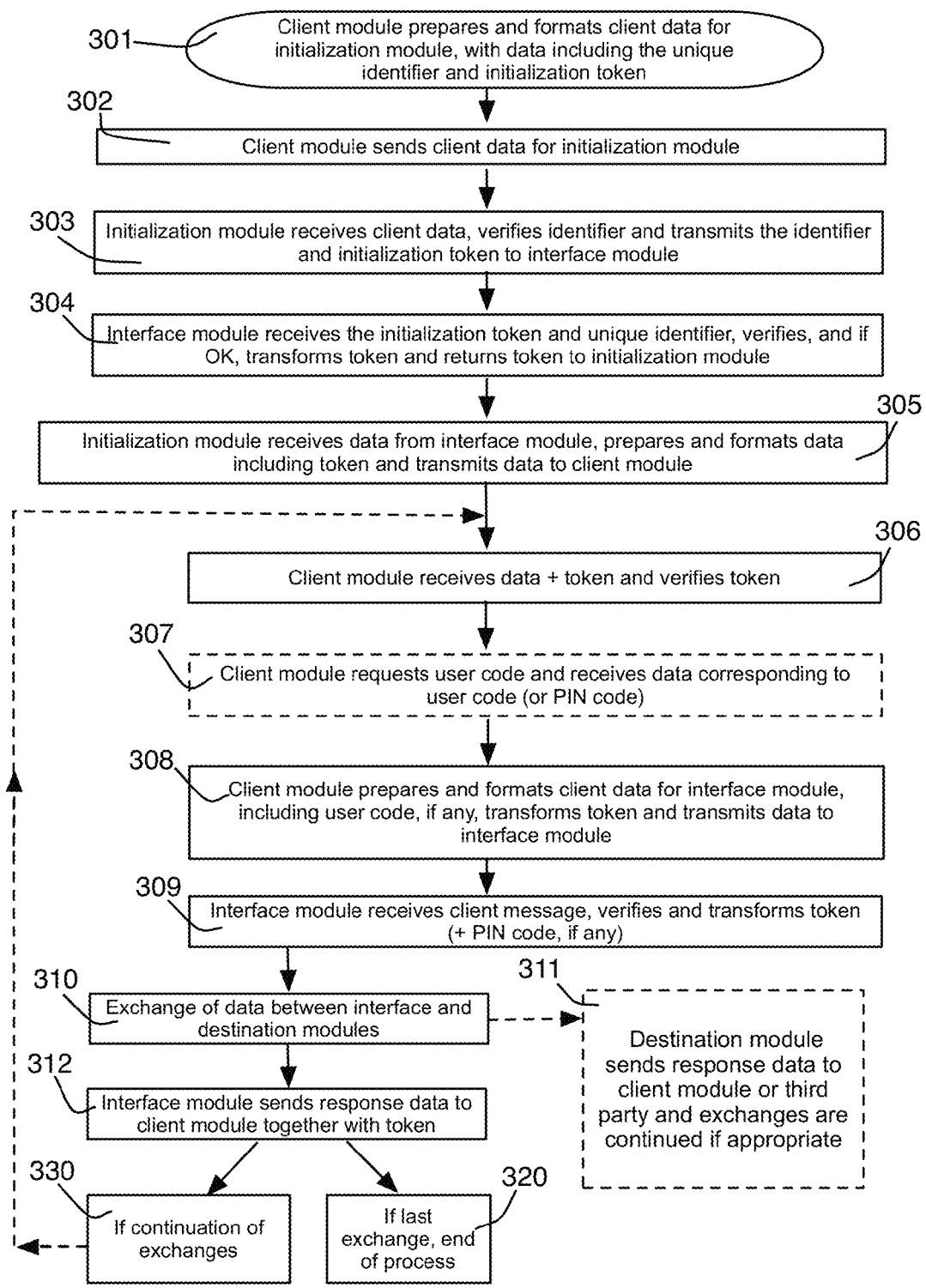
FIG. 8 shows a block diagram of another alternative embodiment of the method for securing data exchanges according to the present invention.

FIG. 8, in connection with FIGS. 4 and 5, schematically illustrates the steps for implementing an advantageous alternative embodiment of the method. At the request and/or under the control of a user 90 (FIG. 4) or a control module 80 (FIG. 5), in step 301, client module 20 prepares and formats client data intended for the initialization module 30 of server module 60, as shown by arrow 1 in FIGS. 4 and 5. The client data includes a unique identifier allowing the issuer of the message or the user to be identified, and a token to be generated by the token module 24. Before it is sent, the token is known only to the client module 20. Communication modules 23 and 33 allow the communication links to be established between client module 20 and initialization module 30.

In step 302, client module 20 sends the client data to initialization module 30, as shown by arrow 2 in FIGS. 4 and 5.

In step 303, initialization module 30 receives the client data, verifies the identifier, and if this identifier is recognized and authorized, transmits the identifier and the token to interface module 40, as shown by arrow 3 in FIGS. 4 and 5.

The reception of this data by interface module 40 is a reliable indication that a client message has been received by initialization module 30 from the user corresponding to the identifier received. In response to the sending of data, in step 304, interface module 40 performs the verification of the unique identifier and/or of the token, and if it is accepted, transforms or reinitializes the token and sends it to initialization module 30 (arrow 4 in FIGS. 4 and 5).

In step 305, initialization module 30 receives the data from interface module 40, prepares and formats the data, which include the token, and sends the data to client module 20, as shown by arrow 5 in FIGS. 4 and 5.

In step 306, client module 20 receives the data, in particular the token, and verifies the token.

In step 307, which is optional, the client module requests a user code from the user 90 or the control module 80 (for example a PIN code) and receives data corresponding to this code. This exchange is represented by arrows 6 and 7 in FIGS. 4 and 5.

In step 308, client module 20 prepares and formats the client data, this time not for the initialization module 30, but for the interface module 40. This data includes the user code (PIN), if any. The received server token is preferably transformed or reset and added to the data to be transmitted. The data is then transmitted to interface module 40. This transfer is represented by arrow 8 in FIGS. 4 and 5. In an alternative embodiment, the token is transformed by incorporating or using the user code as a transformation parameter.

In step 309, the interface module receives the client data, verifies the token and the PIN code, if any, for example by performing a comparison between the received token and the previously generated token. If the data is acceptable, the token is preferably transformed or reset.

In step 310, interface module 40 and destination module 50 exchange data with one another (arrows 9 and 10 in FIGS. 4 and 5). According to the embodiments of the present invention, the kind and/or contents of these exchanges can vary depending on the needs. For example, for a configuration in which the method aims to secure a single data exchange, interface module 40 queries the destination module 50 with a specific request, and the destination module responds by sending the relevant data. Depending on the case, the response of the client module may comprise response data to a request, or, for a configuration in which the method aims to launch a given application in a secure manner, the response may consist in launching said application.

The following steps can vary, depending on the destination of the response data from the client module, and depending on whether or not exchanges are continued for one or more additional loops.

Step 311 relates to the case where the response data from the destination module 50 is transmitted directly to the client module 20, as shown by arrow 11'+ in FIG. 4 and arrow 13+ in FIG. 5, with exchanges being continued, or not, depending on the case. In an alternative embodiment, the data is transmitted to a third party entity 400, with exchanges being continued, or not, as shown in FIG. 4 in connection with arrow 11"+ and the third party entity 400 and in FIG. 5 in connection with arrow 13"+ and the third party entity 400. In another alternative embodiment, data exchanges with a third party entity 400 transit via the interface module 40. In another alternative embodiment shown in FIG. 5, data exchanges continue directly to the control module 80, as shown by arrow 13'+.

Step 312 relates to the case where the response data from the destination module 50 is transmitted to interface module 40 before being retransmitted to client module 20, as shown by arrows 10 and 11 in FIGS. 4 and 5, with exchanges being continued, or not, depending on the case. Step 320 shown in FIG. 8 illustrates an example in which the exchanges are not continued. Step 330 shown in FIG. 8 illustrates an example in which exchanges are continued. The method then continues by returning again to step 306 of FIG. 8, as shown in the diagram.

Arrow 12 in FIGS. 4 and 5 shows the relevant data being subsequently sent either to the user 90 or to the control module 80.

In an advantageous alternative embodiment, the exchanged data is signed and/or encrypted by the cryptographic modules 25, 36 and 47 provided for that purpose in the various modules.

Figure 9:
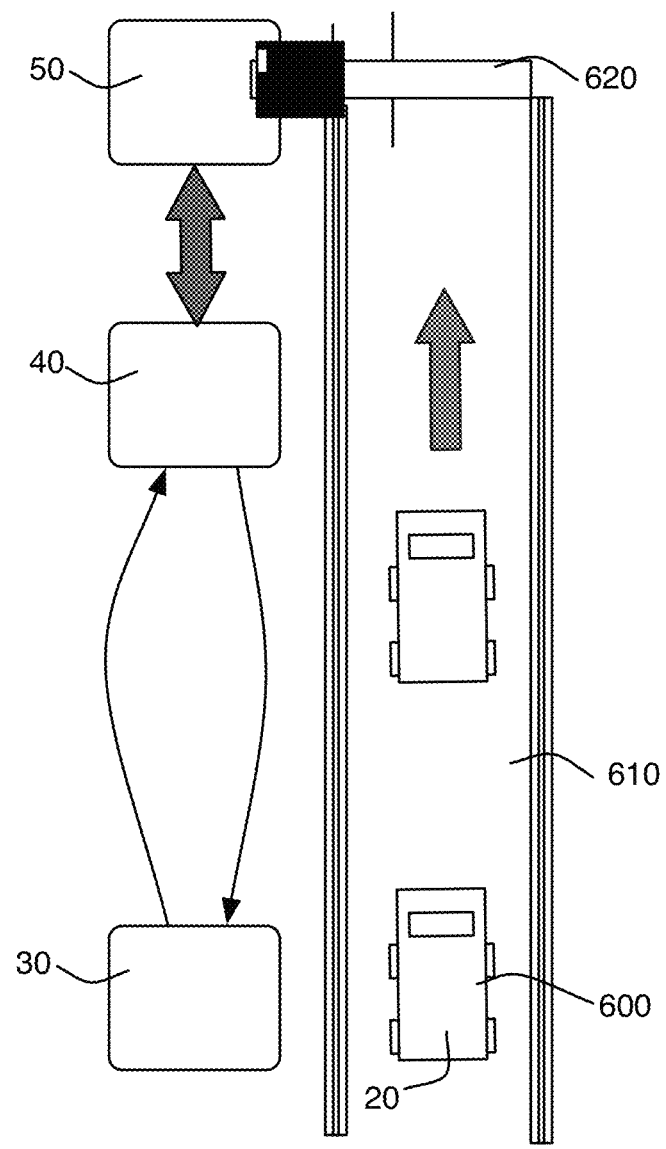
FIG. 9 schematically shows an example application of the method according to the present invention for identifying vehicles at a toll booth.

FIG. 9 schematically shows an example application of the method according to the present invention for identifying vehicles at a tollbooth. Client module 20, which, in this case is a RFID module placed in a vehicle 600, moves through a specially equipped toll area 610. It includes an initialization module 30, positioned at the entrance of the area, an interface module 40, placed slightly downstream, and a destination module 50, placed near to a barrier 620 to control the passage of vehicles. When a vehicle 600 is traveling close to the initialization module 30, the first data exchanges are performed between client module 20 and initialization module 30. For example, the identifier or the driver's toll subscription number, as well as an initialization token are transmitted to initialization module 30. Initialization module 30 and interface module 40 then exchange the relevant data with one another, as explained above, and if the identifier is recognized, the initialization token is transformed and then transmitted to client module 20. Meanwhile, the vehicle continues its progression through the toll corridor 610, and then passes near to the interface module 40. An exchange between client module 20 of vehicle 600 and interface module 40 may then be performed. For example, interface module 40 receives the server token previously transmitted by initialization module 30. If the token is accepted, destination module 50 can allow vehicles to pass and control the opening of barrier 620. Destination module 50 can then generate toll transactions, if any, so that the holder of the subscription identified when passing through the toll can be billed for the corresponding amount. In this example application, the method and system according to the present invention allow data to be secured in relation to an electronic payment, by ensuring the security of data and allowing fast implementation, so that the traffic through the tollbooth can be as fluid as possible. The use of tokens between the various modules, and of multiple verifications allow a possible Man In The Middle type of intrusion to be detected. The method may then either be discontinued, or allow an intrusion alert to be sent.

Figure 10:
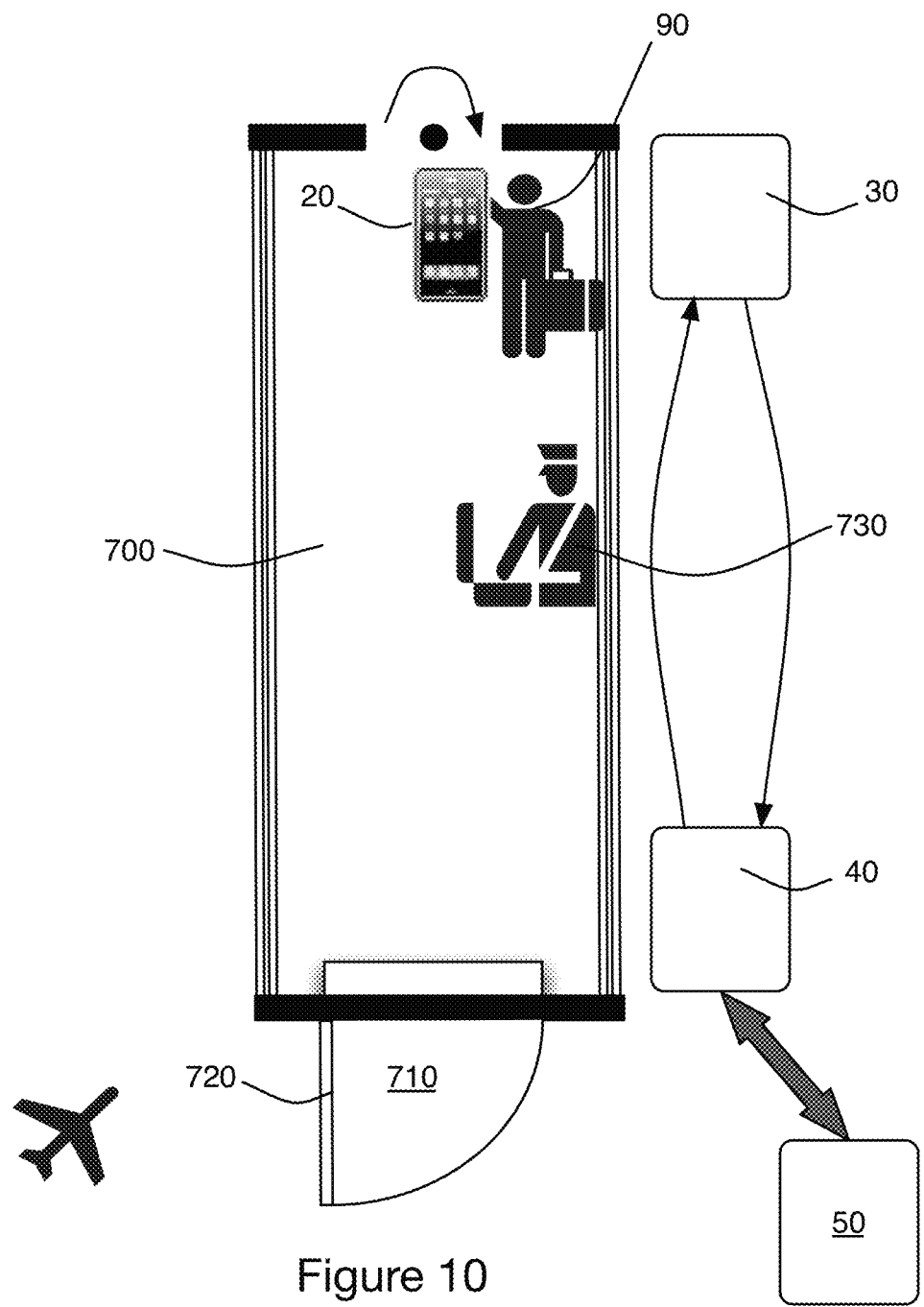
FIG. 10 schematically shows another example application of the method according to the present invention for the use of an electronic ticket, which, in this case is for opening a door providing access to a restricted access area.

FIG. 10 schematically shows another example application of the method according to the present invention for the use of an electronic ticket, which, in this case is for opening a door providing access to a restricted access area. The aim of this example is to ensure that the holder of the electronic ticket is indeed authorized to access a restricted access area 710, such as, for example, an airport boarding platform. A check area 700 in the form of a corridor is complemented with the presence, at the entrance, of an initialization module 30, and towards the exit, of an interface module 40, which are adapted to exchange security data between one another. A client module 20, which, in this example, is provided in the mobile phone of a user 90, sends the electronic ticket data to initialization module 30, which is provided in the vicinity of the entrance to a first check area. In this example, this first area allows a security officer to carry out the usual checks before an aircraft can be accessed. After it has been received by initialization module 30, the ticket data is transmitted to interface module 40. If the data is acceptable, a token is sent to client module 20, which then communicates with interface module 40. If the data is validated, the door 720 is unlocked to allow the passenger to access the restricted area 710. Module 50 may record the fact that the passenger is indeed present in a restricted area, and will be able to report to his plane on time. In this example application, the method and system according to the present invention allow data to be secured in relation to the authentication of an electronic ticket holder, and simplify automated ticket management and use.

Figure 11:
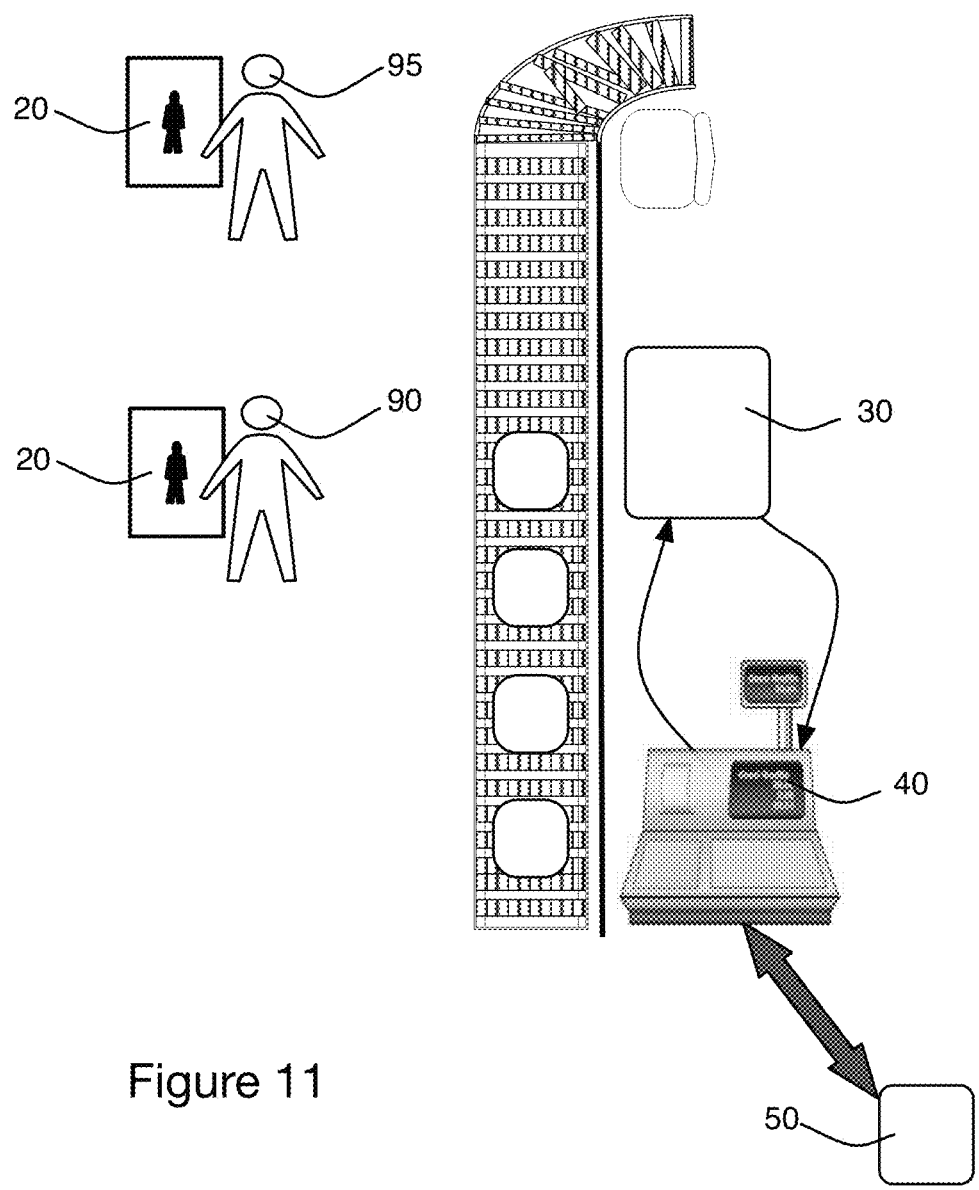
FIG. 11 schematically shows another example application of the method according to the present invention for a secure payment application in a cash register of a supermarket or other type of shop.

FIG. 11 schematically shows another example application of the method according to the present invention for a secure payment application in a cash register of a supermarket or other type of shop. When checking out, a user 90 displays a client module 20, which, in this example, is provided within a payment card. The identifier data is transmitted to initialization module 30, in connection with an interface module 40, which, in this example, is provided in connection with an electronic payment device. If the identifier data is accepted, the amount to be paid is transmitted to client module 20. The user confirms his agreement to pay by entering a personal code (PIN code), for example using a keyboard provided for that purpose. After data validation, payment may be made, in connection with the destination module 50, for example a commercially available payment center, which can, if needed, communicate with a third party, for example to charge a user account. A payment receipt can then be transmitted to client module 20 to complete the transaction. In this example application, the method and system according to the present invention allow payment data to be secured, prevent a third party user 95 from unintentionally paying instead of user 90, or a user 90 from paying a transaction other than that intended, for example for the benefit of a third party 95 near to the checkout area.

Many other types of application, not illustrated, are also possible. For example, to ensure secure payment of movies or television programs, to ensure the exchange of confidential data between two servers. In such a case, the confidential data is for example located at the destination module 50, for secure transmission to module 20. In the field of home automation, the method and system according to the present invention can be used to monitor a site in order to detect any intrusion, to control home automation systems such as air conditioning or heating, shutters, lighting, etc.

Depending on the application, a client module 20 can be integrated or combined with various types of device, such as, for example, a computer, a mobile phone, a smart card, a USB stick with a microprocessor, a smart label. It should be noted that client module 20 does not necessarily have an integrated power supply.

The Figures and their descriptions presented above illustrate rather than limit the invention. In particular, the invention and its various alternative embodiments have been described in relation to a particular example involving independent initialization, interface, and receiver modules, 30, 40 and 50, respectively.

Nevertheless, it will be apparent to those skilled in the art that the invention can be extended to other embodiments which, alternatively, are such that the destination module 50 is attached to, or integrated into, the interface module 40. According to another alternative embodiment, the three modules are integrated or attached, although the mode of operation of the method is similar to that previously described. According to an alternative embodiment of the method according to the invention, after an initial exchange of data between the client module 20 and the initialization module 30 has taken place, an additional data exchange is performed between the initialization module and the receiver module 50.

For example, in the embodiment shown in FIG. 10, such an exchange with the receiver module could be used to trigger the opening of the first door, for a first level of security. The method then continues with the exchange of data between the initialization module 30 and the client module 20 and then the interface module 40, as previously described.

The reference numerals used in the claims are in no way limiting. The words "comprise" and "include" do not exclude the presence of items other than those listed in the claims. The word "a" preceding an item does not exclude the presence of a plurality of such items.

The invention claimed is:

1. A method for securing the exchange of data between a client module and a third party destination module via a server module, wherein the server module includes a set of security modules, with the method including the following, in which:
- a token module of the client module receives an initiating input from a user and initiates a securing process by generating an initialization token and the client module sends the data, which includes a unique identifier and the initialization token to a first security module of the server module;
- the first security module of the server module receives the data and verifies the unique identifier and the initialization token;
- the first security module and a second security module exchange security data bilaterally and consecutively with one another;
- the server module transforms the initialization token to generate a transformed token;
- the first security module of the server module sends the data containing the transformed token to the client module;
- the client module receives the data containing the transformed token, verifies the transformed token and, if accepted, further transforms the transformed token;
- the client module sends the data, which includes the unique identifier and the transformed token to the second security module of the server module;
- the second security module of the server module receives the data, verifies the unique identifier and the transformed token;
- the second security module communicates with a third party destination module; and
- the third party destination module responds.

2. The method of claim 1, wherein the third party destination module responds to the second security module which transmits the data to the client module.

3. The method of claim 1, wherein the third party destination module directly responds to the client module.

4. The method of claim 1, wherein the token is at least one of initialized and transformed by the second security module and transmitted to the first security module.

5. The method of claim 1, wherein after a module has received a token, the token is at least one of transformed and reset.

6. The method of claim 1, wherein the data exchanged between the client module and the server module includes a digital signature.

7. The method of claim 1, wherein, after the data has been sent to the client module, the client module sends the data at least once more to the second security module of the server module.

8. The method of claim 1, wherein, during an iteration between the client module and the second security module, the data last sent by a destination includes a token which is distinct from a previous token.

9. The method of claim 1, wherein the client module and the second security module of the server module exchange the data in turn, with, in each exchange loop, an intermediate exchange being performed between the second security module and a destination module.

10. The method of claim 1, wherein the client module and a destination module exchange the data in turn.

11. A system for securing an exchange of the data between the client module and the server module for implementation of the method according to claim 1, wherein:
- the client module comprises a microprocessor, a memory and a communication module; and
- the server module comprises a microprocessor, a memory and a set of security modules including at least two security modules, each provided with:
  - a communication module, to perform data exchanges between the client module and the server module;
  - a verification module, to check the data provided by another module; and
  - a security exchange module, to exchange bilaterally and consecutively security data between ones of the set of security modules of the server module;
- wherein the server module and the client module each include at least one token module to generate the initialization tokens;
- wherein the set of security modules comprises a first security module, for carrying out the first exchanges with a client module in a data exchange loop between the client module and the server module, and a second security module, for carrying out subsequent exchanges with the client module; and
- and wherein the client module and the at least two security modules of the server module are arranged according to a triangular architecture.

12. The system of claim 11, wherein the token modules allow a first token to be initialized and a previously received token to be transformed.

13. The system of claim 11, wherein the token module of the server module is associated with the second security module.

14. The system of claim 11, wherein the token modules are adapted to generate random numbers.

15. The system of claim 11, wherein the client module also comprises a cryptographic module to perform at least one of encrypt data, decrypt data, digitally sign data, and check digital signatures.

* * * * *